(12) United States Patent
Graves

(10) Patent No.: US 7,616,897 B2
(45) Date of Patent: Nov. 10, 2009

(54) DATA PORT ALIGNMENT OF FREE SPACE OPTICAL COMMUNICATIONS TERMINAL WITH ADAPTIVE OPTICS

(75) Inventor: J. Elon Graves, Los Gatos, CA (US)

(73) Assignee: AOptix Technologies, Inc., Campbell, CA (US)

( * ) Notice: Subject to any disclaimer, the term of this patent is extended or adjusted under 35 U.S.C. 154(b) by 411 days.

(21) Appl. No.: 11/387,500

(22) Filed: Mar. 22, 2006

(65) Prior Publication Data

US 2007/0223929 A1    Sep. 27, 2007

Related U.S. Application Data

(60) Provisional application No. 60/664,798, filed on Mar. 23, 2005.

(51) Int. Cl.
    *H04B 10/00* (2006.01)
(52) U.S. Cl. .................. 398/129; 398/119; 398/122
(58) Field of Classification Search ......... 298/119–123, 298/129, 131
    See application file for complete search history.

(56) References Cited

U.S. PATENT DOCUMENTS

| 6,452,145 | B1  | 9/2002  | Graves et al. |
| 6,464,364 | B2  | 10/2002 | Graves et al. |
| 6,568,647 | B2  | 5/2003  | Graves et al. |
| 6,721,510 | B2* | 4/2004  | Graves et al. ............... 398/129 |
| 7,289,736 | B1* | 10/2007 | Graves ....................... 398/119 |
| 2004/0086282 | A1* | 5/2004 | Graves et al. ............... 398/202 |

OTHER PUBLICATIONS

U.S. Appl. No. 10/756,174, filed Jan. 11, 2004, Graves.

* cited by examiner

*Primary Examiner*—Dzung D Tran
(74) *Attorney, Agent, or Firm*—Fenwick & West LLP

(57) ABSTRACT

An approach for aligning an adaptive optics module and a data port in a free space optical communications terminal. A wavefront sensor in the adaptive optics system is aligned to a reference port. The data port is also aligned to the reference port. In this way, alignment of the wavefront sensor and the data port is achieved.

20 Claims, 6 Drawing Sheets

DATA PORT ALIGNMENT OF FREE SPACE OPTICAL COMMUNICATIONS TERMINAL WITH ADAPTIVE OPTICS

RELATED APPLICATION INFORMATION

This application claims priority under 35 U.S.C. § 119(e) from U.S. Provisional Patent Application Ser. No. 60/664,798, filed on Mar. 23, 2005, entitled "Data Port Alignment of Free Space Optical Communications Terminal with Adaptive Optics."

BACKGROUND

1. Field of Invention

This invention relates generally to adaptive optics systems and, more particularly, to alignment of adaptive optics systems.

2. Description of the Related Art

With recent advances in technology, there is an increasing interest in the use of free-space optical communications for various applications. Compared to other communications technologies, a free-space optical communications link can have advantages of higher mobility and compact size, better directionality (e.g., harder to intercept), faster set up and tear down, and/or suitability for situations where one or both transceivers are moving. Thus, free-space optical communications links can be used in many different scenarios, including in airborne, sea-based, space and/or terrestrial situations.

In many of these potential applications, the free-space optical communications link suffers from optical aberrations. For example, changes in atmospheric conditions can be a significant impediment to the accuracy, reliability and efficiency of free-space optical communications systems. Wind, heat waves, man-made pollutants and other effects can create constantly changing aberrations. This, in turn, can degrade the quality of the optical signal that is available at the receiver, resulting in degradation of the overall quality and efficiency of the communications channel. There is an increasing interest in using adaptive optics to correct for these aberrations, thus improving the performance and reliability of free space optical data transmission systems.

A free space optical communications terminal typically includes both adaptive optics components (e.g., wavefront sensor, deformable mirror, etc.) and data ports (e.g., data transmitter(s) and/or data receiver(s)). It is important to align the adaptive optics components and the data ports. The adaptive optics components and the data ports may be aligned initially during the manufacturing or building process of the terminal. However, the terminal may become misaligned after it has been deployed for use in the field. Over time, vibrations, temperature fluctuations and weather conditions can adversely affect the optical alignment of these components.

In addition, for certain applications, the terminal may be subjected to transient misalignments. For example, if a terminal is mounted on a vehicle that is traveling over rough terrain, the sudden jolts experienced by the vehicle may continuously misalign the components, thus requiring some sort of active alignment. In other applications, such as deployments on orbiting satellites or in remote locations, it may be difficult for a human to gain access to manually re-align the adaptive optics system and the data ports, thus favoring some sort of automatic alignment.

Hence, there is a need for approaches to align adaptive optics components and data ports. There is also a need for methods to align the adaptive optics and data ports remotely or automatically, without human intervention.

SUMMARY OF THE INVENTION

The present invention overcomes the limitations of the prior art by providing a reference port. The various adaptic optics components and data ports are each aligned to the reference port, resulting in alignment of these components to each other. In one approach, a wavefront sensor in the adaptive optics system is aligned to a reference port. The data port is aligned to the reference port. In this way, alignment of the wavefront sensor and the data port is achieved.

In one implementation, a free space optical communications terminal includes a data port, an adaptive optics module which includes a wavefront sensor, a reference port and a controller. A first reference beam is transmitted from the reference port to the wavefront sensor, and the controller aligns the reference port and the wavefront sensor based on this reference beam. For example, the controller may adjust the adaptive optics module to introduce a wavefront correction that aligns the reference port and the wavefront sensor. A second reference beam is transmitted between the reference port and the data port (it could be transmitted in either direction, depending on whether the data port is a receive data port or a transmit data port). The controller aligns the reference port and the data port based on this second reference beam. For example, it may adjust a position of the data port to maximize coupling of the second reference beam between the data port and the reference port. In this way, the data port is aligned to the wavefront sensor.

In one variation, the free space optical communications terminal includes two data ports: one receive data port and one transmit data port. Reference beams are transmitted between each data port and the reference port. The controller aligns the reference port and each data port based on the respective reference beam. In a specific implementation, the reference port includes an optical fiber that both transmits a reference beam to the receive data port and receives a reference beam from the transmit data port.

In another implementation, a free space optical communications terminal includes transmit and receive data ports, an adaptive optics module including a deformable mirror and a wavefront sensor, a reference port and a controller. The deformable mirror is positioned both to pre-correct a primary optical beam generated by the transmit data port and to post-correct a primary optical beam received by the receive data port. Reference beams are transmitted between the reference port and each of the wavefront sensor, the receive data port and the transmit data port. The reference beams propagate via the deformable mirror. The controller aligns the wavefront sensor and the reference port by adjusting the deformable mirror according to a wavefront of the respective reference beam. The controller aligns each of the data ports and the reference port according to the strength of the respective reference beams after transmission.

Other aspects of the invention include devices, components and systems based on the terminals described above, applications for the above, and corresponding methods.

DETAILED DESCRIPTION OF THE PREFERRED EMBODIMENTS

Figure 1A:
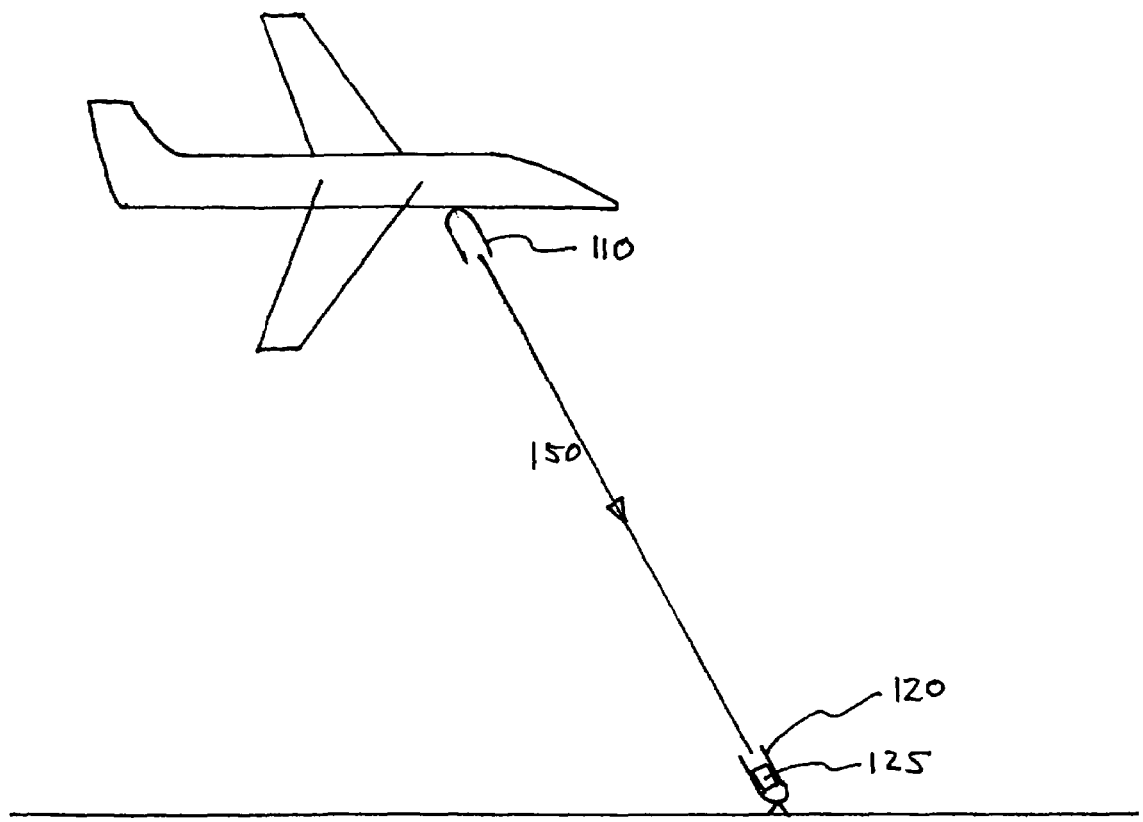
FIGS. 1A-1C are illustrations of free-space optical communications systems suitable for use with the present invention.
Figure 1B:
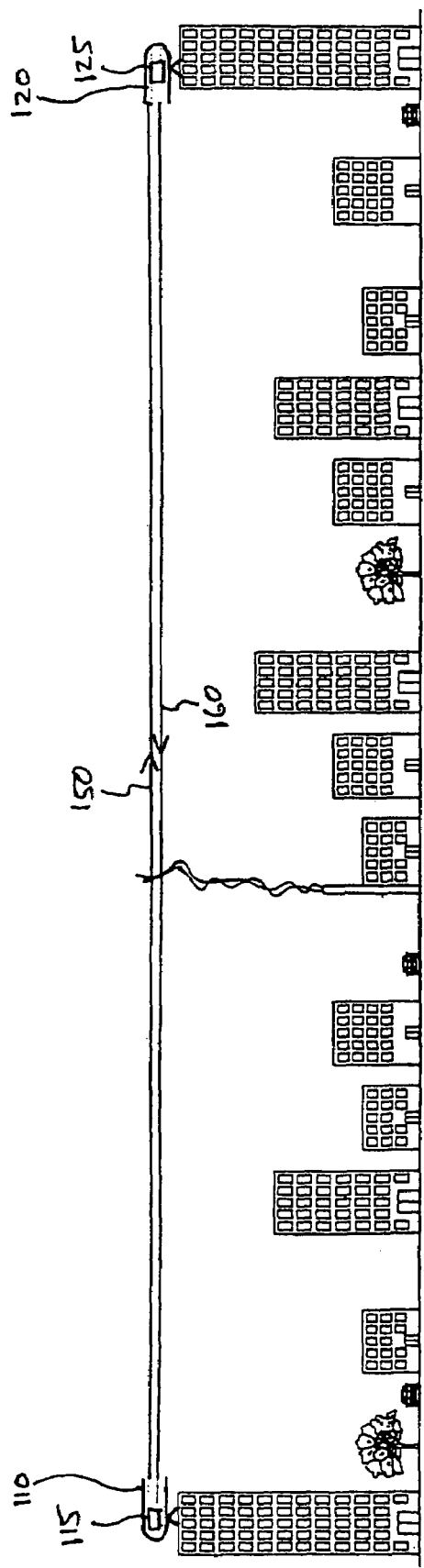
Figure 1C:
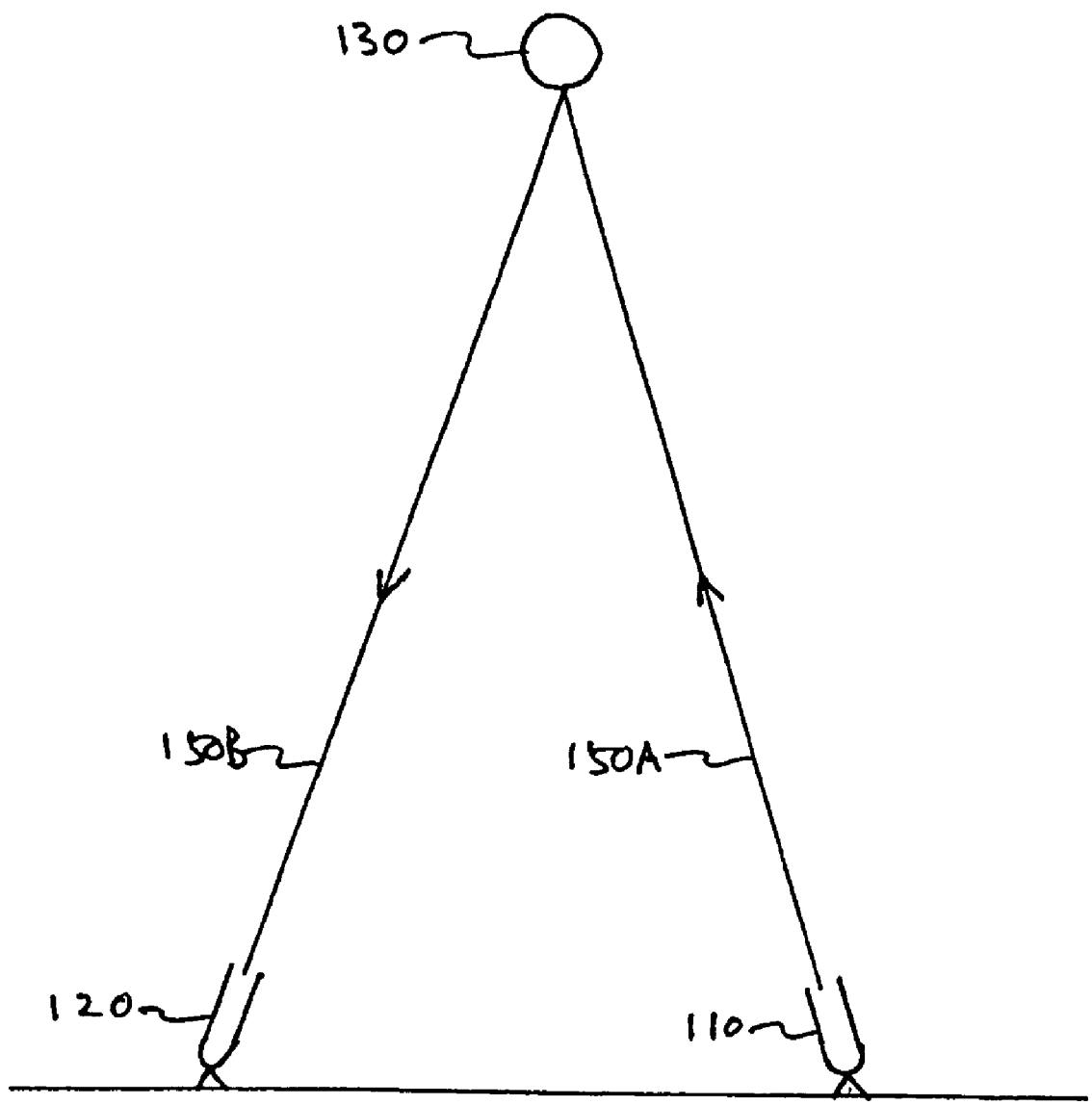

FIGS. 1A-1C are illustrations of example free-space optical (FSO) communications system using adaptive optics. The FSO communications system in FIG. 1A is designed to communicate data over a FSO data link 150 from an airborne transmitter 110 to a land-based receiver 120 which may be either stationary or mobile. For convenience, the term "transceiver" will be used to refer to modules that only transmit 110 and to modules that only receive 120, as well as to modules that both transmit and receive.

Each transceiver 110, 120 includes a telescope that is pointed at the telescope of the other transceiver. The transmitting telescope 110 typically includes components for tracking and directing an optical beam 150 to the receiving telescope 120. The receiving telescope 120 typically includes components for following and receiving the optical beam 150 from the transmitting telescope 110. Examples of components that can be used for these purposes include steering mirrors, mechanical gimbals, tracking mechanisms and control loops, auto-focus and zoom capability.

The FSO communications link 150 can suffer from time-varying aberrations. For example, for many applications, the effect of the atmosphere can be a significant source of aberrations. The density of the atmosphere generally varies across time and space, typically at a rate of about 1 kHz or less for turbulent cells. The resulting aberrations can cause unwanted effects, such as divergence resulting in beam wander, scintillation patterns at the receiver 120 and degraded wavefronts.

In the example of FIG. 1A, these aberrations are corrected, either partially or fully, by an adaptive optics module 125 at the receiver 120. The adaptive optics module 125 corrects the wavefront of the incoming light, which in turn facilitates manipulating the optical beam at the receiver 120. Typically, the wavefront correction applied by the adaptive optics module 125 is determined by directly measuring the wavefront of the incoming optical beam 150 (usually after correction), although other methods for estimating the aberrations or the incoming wavefront can be used.

The level of correction applied by an adaptive optics system is often referred to as the order of the adaptive optics system. For convenience, the term first order adaptive optics will be used to refer to adaptive optics systems that correct for tip, tilt and/or lower order aberrations (e.g., piston) but not for defocus or higher order aberrations. The term higher order adaptive optics will be used to refer to adaptive optics systems that correct for defocus and/or higher order aberrations.

In the example of FIG. 1B, the FSO communications system is used in an urban environment where a transmitter 110 and receiver 120 are located on the roofs of two buildings. FIG. 1B shows buildings of different heights, automobiles, roadways, trees and a smoke stack on one building, which create different atmospheric conditions. Rain, fog, smoke and the like lower the intensity of the transmitted light. Conditions such as sun-induced and structure-created heat waves, air conditioning discharges, heat exchanger discharges, automobile exhaust, etc. create aberrations along the optical link 150 in addition to the normal atmospheric aberrations caused by weather conditions. In rural applications, the varying terrain and vegetation can influence the aberrations along the optical link 150.

In FIG. 1B, each transceiver 110, 120 includes an adaptive optics module 115, 125 in order to mitigate the atmospheric conditions that otherwise would adversely affect the transmission and reception of data-encoded light waves. In the transmitter 110, the adaptive optics 115 pre-corrects the wavefront of the outgoing light. This pre-correction reduces beam wander and scintillation patterns at the receiver 120, thus increasing the amount of light incident on the receiver 120 and also improving the wavefront quality of the received optical beam. At the receiver 120, the adaptive optics 125 corrects aberrations in the received wavefront, thus improving the image quality and/or collection efficiency at the receiver.

At the receiver 120, the wavefront correction applied by the adaptive optics module 125 is determined based on the wavefront of the incoming optical beam 150. A counter-propagating probe beam 160 is used for the adaptive optics module 115 at the transmitter 110 encoded beam 150, but in the opposite direction. It can be the same wavelength as or a different wavelength than the primary beam 150. The probe beam 160 experiences substantially the same aberrations as the primary beam 150 and the pre-correction applied by the adaptive optics module 115 is based on the wavefront of the probe beam 160. In a similar fashion, a co-propagating probe beam (not shown in FIG. 1B) could be used at the receiver 125 as the basis for correcting the wavefront of the primary beam 150, rather than using the primary beam 150 itself.

In the dual-ended correction system of FIG. 1B, the two adaptive optics modules 115, 125 may interact undesirably under certain conditions. In one approach to mitigating this effect, a characteristic propagation distance can be defined as $z0=\pi\sigma^2/\lambda$, where $\sigma$ is the width of the projected beam (assumed to be Gaussian in this example) and $\lambda$ is the wavelength. For example, with a beam width $\sigma$ of 4 cm and a wavelength of 1.55 μm, the characteristic propagation distance would be approximately 3 km. For link distances that are less than the characteristic propagation distance, phase information may propagate from the transmitter 110 to the receiver 120, creating a feedback path through both adaptive optics modules 115, 125 and possibly causing instability in the adaptive optics modules. This effect can be reduced by reducing the size of the transmitted beam, for example with zoom optics. Alternatively, a differential focus between the transmitter 110 and the receiver 120 can be used to ensure that the aperture of the receiving telescope is not significantly underfilled. At link distances that are greater than the characteristic propagation distance, phase variations at the transmitter 110 are generally converted to amplitude variations at the receiver 120, with the data signal strength falling off as the square of the distance. As a result, phase instability is less of a problem at these longer link distances.

A second effect which occurs at link distances that are short compared to the characteristic propagation distance is that pupil illumination may become non-uniform. One remedy is to adjust the focus of the transmitting telescope 110 in order to spread the pupil illumination by the primary beam 150.

The communications links 150, 150 in FIGS. 1A and 1B are shown as unidirectional. Two separate unidirectional systems can be used to create a bi-directional system. More economically, the transmitter and receiver at each location can be combined into a single unit, for example by providing both a data source (e.g., a modulated laser or a fiber optic feed) and a data receiver (e.g., a photodetector or an outgoing optical fiber) at each transceiver 110, 120 and sharing much of the same telescope optics, including adaptive optics correction.

For example, in FIG. 1B, optical beam 160 could also be encoded with data. Then, for data transmission from 110 to 120, transceiver 110 is the transmitter, beam 150 is the data-encoded primary beam, beam 160 is the probe beam, and transceiver 120 is the receiver. In the reverse direction, transceiver 120 is the transmitter, beam 160 is the data-encoded primary beam, beam 150 is the probe beam, and transceiver 110 is the receiver. Note that each beam 150, 160 serves two purposes. It is the data-encoded primary beam in one direction and the probe beam in the other direction. In addition, each adaptive optics module 115, 125 pre-corrects beams that are leaving that transceiver and post-corrects beams received by that transceiver. An alternate implementation uses four beams: two data-encoded beams and two probe beams, all sharing the same telescope optics at both transceivers 110, 120.

FIG. 1C is an illustration of yet another FSO communications system using adaptive optics. This example uses a modulated retro reflector 130. The transmitter 110 transmits an optical beam 150A to the retro reflector 130. Modulation of the retro reflector 130 encodes data onto the beam and the retro reflector 130 reflects the data-encoded beam 150B back to the general vicinity of the original source 110. In one implementation, the same telescope 110 receives the return beam 150B. However, in many applications, the retro reflector 130 is limited in size and the diffraction-limited spot size of the return beam 150B is significantly larger than the size of the telescope aperture. Thus, a separate telescope 120 can be used as the receiver, as shown in FIG. 1C. Alternately, the retro reflector 130 can be replaced by a reflector that is not retro. Adaptive optics modules can be used in either or both telescopes (and also in the retro reflector) to pre- or post-correct the optical beam 150, and the communications link can be either unidirectional or bi-directional.

FIGS. 1A-1C are merely examples. Other applications will be apparent. Furthermore, the choice of wavelengths, data rate, link distance, telescope design, data sources and light sources, data receivers and other design choices will depend on the application. The FSO communications link itself can vary significantly depending on the application. In one application, both transceivers are ground-based and the link is primarily along the earth's surface. Examples include links in urban environments, rural environments or across bodies of water. In other applications, the link can be ground-to-air or air-to-ground (e.g., between a ground station and aircraft) or air-to-air (e.g., between aircraft). The FSO communications systems can also be either unidirectional or bi-directional, and utilize either single-ended or dual-ended adaptive optics correction. The principles described here apply to these situations.

Data rates and distances upwards of 100 Gbps and 27 km have been experimentally demonstrated, although different combinations of data rates and distances can be appropriate depending on the application. Wavelengths in the 1.55 μm (micron) wavelength region are currently preferred for telecommunications applications, although other wavelengths may be used and even preferred under certain atmospheric conditions or for other types of applications. For instance, the 1.3 μm wavelength region may perform well in a single wavelength mode. Terms such as "optical" or "light" are not intended to be limited to any one specific wavelength range. Nor are they meant to be limited to the visible region of the electromagnetic spectrum.

Any number of sources can be used for the data-encoded beam. For example, an optical fiber carrying a data-encoded optical signal can be directly coupled to the transmitting telescope. If the data signal is electrical, then an electrical-optical conversion can be made. For example, electrical data can be used to internally modulate a laser diode (or other light source). Alternately, the optical beam from a laser (or other light source) can be externally modulated by electrical data, for example via a Mach-Zender modulator. If the data signal is optical but of a wavelength that is incompatible with the present system, then a wavelength conversion can be made, such as from the 1.3 μm wavelength region to the 1.55 μm wavelength region. The wavelength conversion can be made by optical means (e.g., based on nonlinear optical phenomenon) or by optical-electrical-optical means.

At the receiver, the received optical beam may be processed or retransmitted in many different ways. For example, some of the incoming light may be coupled directly into an outgoing fiber. Alternately, it may be converted to electrical form by a photodetector or other optical-electrical converter. As a final example, it can be amplified and coupled into another FSO communications link for further transmission.

The adaptive optics module itself can also have different levels of sophistication. In simple applications, correction of only tip/tilt with or without focus may be sufficient. In more demanding applications, correction of higher order aberrations can be implemented. Simple first order adaptive optics corrections such as tip/tilt may be implemented or augmented by other components such as a steering mirror, leaving the adaptive optics module to correct for higher order aberrations.

The telescope optics can also vary. Refractive, reflective or hybrid designs can be used. In some applications (for example over short distances), a telescope may not be necessary. Alternately, collecting optics other than a telescope may be appropriate. Further examples of FSO communications systems using adaptive optics are described in U.S. Pat. No. 6,721,510, "Atmospheric Optical Data Transmission System," filed Jun. 16, 2001 by J. Elon Graves and Malcolm J. Northcott, which is incorporated herein by reference.

Figure 2:
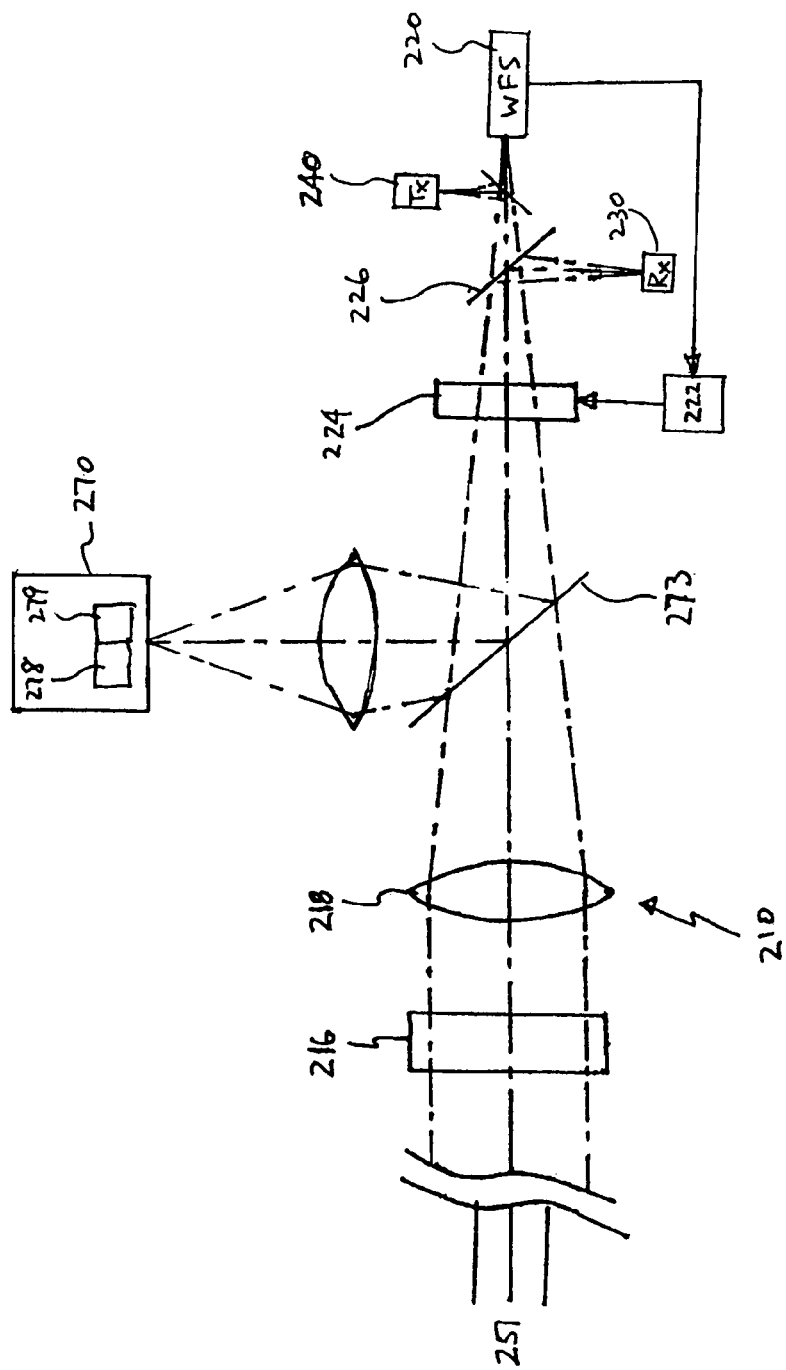
FIG. 2 is an illustration of an adaptive optics module according to the invention.

FIG. 2 is an illustration of an adaptive optics module according to the invention. The system includes a telescope 210 (represented by lens 218 in FIG. 2), a variable phase device 224 and a wavefront sensor 220. The variable phase device 224 and wavefront sensor 220 are located in the optical path of the telescope, with the wavefront sensor 220 downstream of the variable phase device 224. This system also includes both a data port 230 for receiving and a data port 240 for transmitting. The system also includes a beam-steering mechanism 216, for example a tip-tilt mirror. A reference port 270 is used to align the wavefront sensor 220 and the data ports 230, 240. The reference port 270 includes a transmitter 278 and receiver 279.

Ignoring the reference port 270 for now, in the receive direction, the system couples light 251 from a remote source (e.g., from the transmitting telescope) into the receive data port 230. The variable phase device 224 and wavefront sensor 220 form an adaptive optics loop that compensates for aberrations along the FSO communications link. The variable phase device 224 introduces an adjustable phase that compensates for the effects of unwanted aberrations, thus reducing the residual aberration in the wavefront. Examples of variable phase devices 224 include deformable mirrors, liquid crystal devices, MEMS mirrors, acousto-optic, thermo-optic, magneto-optic and electro-optic modulators, eidophors and optically written optically active materials devices. The wavefront sensor 220 takes a measure of the actual amount of residual aberration after correction and control module 222 sends the corresponding control signals to the variable phase device 224. Examples of wavefront sensors 220 include Hartmann-Shack wavefront sensors and wavefront curvature sensors.

In this way, the wavefront of the incoming optical beam can be corrected for aberrations, resulting in better image quality and/or collection efficiency at the receive data port 230. The adaptive optics preferably corrects the wavefront at a rate that is significantly faster than the rate of change of aberrations along the optical path, for example preferably faster by about a factor of ten or more. If the aberrations are primarily caused by atmospheric conditions, it is desirable that the variable phase device 224 make adjustments at a rate of about 10 kHz or greater since turbulence microcells in the atmosphere change at a rate of about 1 kHz.

In the transmit direction, the transmit data port 240 generates an optical beam to be transmitted over approximately the same FSO communications link as the received optical beam. The optical beam from the transmit data port 240 is pre-corrected by the variable phase device 224. This increases the amount of energy incident on the receiving telescope and can also reduce scintillation effects.

Note that, due to the use of beamsplitters (or other types of beam-multiplexing devices), much of the optical path traversed by the received optical beam and by the transmitted optical beam is common. Thus, the same adaptive optics correction can be applied both to post-correct the received optical beam and to pre-correct the transmitted optical beam.

For proper operation, the wavefront sensor 220, receive data port 230 and transmit data port 240 preferably are aligned to each other. The desired alignment does not necessarily require that all of these components are pointed in exactly the same direction. In some applications, the optical paths for the transmitted optical beam and the received optical beam may be slightly separated when the components are properly aligned. For example, if a ground-based transceiver is communicating with a satellite, the transmitted optical beam may "lead" the received optical beam in order to account for the satellite's motion. This point-ahead requirement will result in slightly separated optical paths for the transmitted optical beam and the received optical beam when the components are properly aligned.

The reference port 270 is used to maintain the desired alignment. In this example, the reference port 270 includes both a reference transmitter 278 and a reference receiver 279. In one embodiment, the reference transmitter 278 is implemented as an optical fiber (not shown) that provides a beam with a small cross-sectional spot size directed toward beamsplitter 273. The same optical fiber also serves as the reference receiver 279. The reference beams transmitted from the fiber and received by the fiber are separated by an optical circulator. In an alternate design, the transmitter 278 and receiver 279 may be laterally offset relative to one another, for example to account for a point-ahead requirement.

The reference transmitter 278 generates a reference beam that reflects off of beamsplitter 273 to the variable phase device 224, and then to the wavefront sensor 220 and the receive data port 230. The reference receiver 279 receives a reference beam generated by the transmit data port 240, which propagates via the variable phase device 224 and beamsplitter 273 to the reference receiver 279.

The reference port 270 is used to align the wavefront sensor 220 with the reference transmitter 278, the receive data port 230 with the reference transmitter 278 and the transmit data port 240 with the reference receiver 279. Since the reference transmitter 278 and reference receiver 279 are aligned to each other, this results in alignment of the wavefront sensor 220 and two data ports 230, 240.

Figure 3:
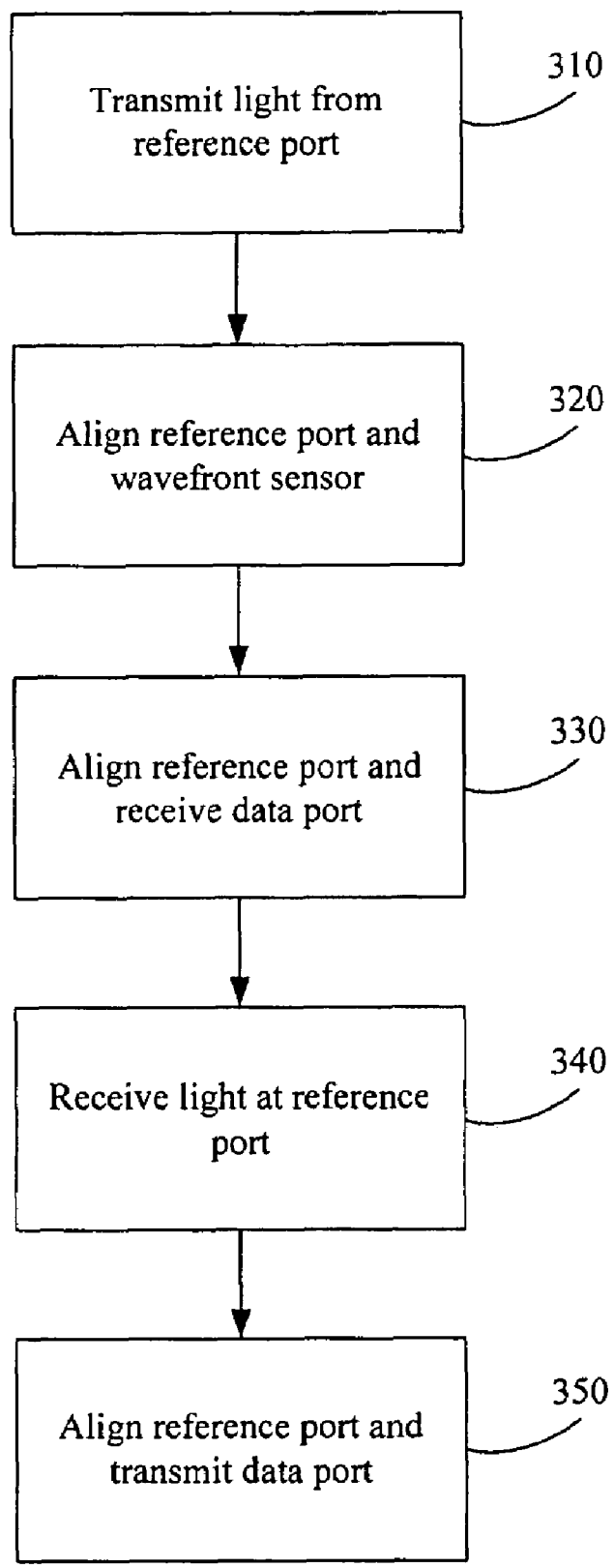
FIG. 3 is a flow diagram illustrating a method of aligning the adaptive optics module of FIG. 2, according to the invention.

FIG. 3 is a flow diagram illustrating one method 300 of aligning the wavefront sensor 220 and data ports 230, 240 of the free space optical communications terminal shown in FIG. 2. The reference transmitter 278 produces a reference beam that propagates 310 to the wavefront sensor 220 via the beamsplitter 273 and variable phase device 224.

The wavefront sensor 220 is aligned 320 to the reference port 270 (specifically, the reference transmitter 278) based on this reference beam. In one particular approach, the alignment is achieved by changing the phase introduced by the variable phase device 224. As long as the reference beam from the reference port 270 falls within the wavefront sensor 220's field of view, the wavefront sensor 220 detects the wavefront generated by the reference port 270. Misalignment is manifested as an error in the wavefront (e.g., a tip/tilt). The controller 222 corrects the misalignment by adjusting the variable phase device 224, thus adjusting the overall optical path and aligning the wavefront sensor 220 to the reference port 270. Further details on aligning wavefront sensors are described and shown in U.S. patent application Ser. No. 10/756,174, "Adaptive Optics Imaging System with Object Acquisition Capability," filed Jan. 12, 2004 by J. Elon Graves, which is incorporated herein by reference.

In an alternate embodiment, the alignment 320 can be achieved by moving the wavefront sensor 220 and/or the reference transmitter 278 relative to each other. In another approach, alignment 320 can be achieved by introducing variations in the optical path and/or phase at points other than the variable phase device 224. Once the reference port 270 and the wavefront sensor 220 have been aligned, if necessary, the adaptive optics loop can be used to dynamically adjust the optical path in order to maintain the alignment for the remainder of the alignment process.

In step 330, the receive data port 230 and the reference port 270 are aligned based on a reference beam transmitted from the reference transmitter 278. In one approach, the position of the receive data port 230 is adjusted until the light coupled from the reference port 270 to the receive data port 230 is maximized.

In step 340, the transmit data port 240 produces a reference beam that propagates to the reference port 270 (specifically, the reference receiver 279) via the variable phase device 224 and beamsplitter 273. This light is used to align 350 the transmit data port 240 and the reference port 270. In one approach, the position of the transmit data port 240 is adjusted until the light coupling between the transmit data port 240 and the reference port 270 is maximized.

In both steps 330 and 340, adjustment of the data ports can be done manually or automatically. Depending on the application, the adjustment mechanism for these data ports may include micrometer screws, piezo actuators, or other suitable adjustment mechanisms. For clarity, the controllers for these adjustments are not explicitly shown in FIG. 2. The single term controller will be used to refer to all controllers (including the adaptive optics controller 222). However, this does not imply that all functions must be implemented in a single device. Different control functions may be implemented in different devices.

At this point, the wavefront sensor 220, the receive data port 230 and the transmit data port 240 are all aligned with the reference port 270. Therefore, they are also aligned to each other.

FIG. 3 is an example. Many variations are possible. For example, the different steps can occur in different orders or simultaneously. The alignment of the different components to the reference port 270 need not occur in a specific order. In addition, some terminals may not have both a receive data port 230 and a transmit data port 240. They may have only a receive data port or only a transmit data port, in which case the alignment step in method 300 corresponding to the other type of data port is skipped. Alternately, there may be more than one data port (e.g., multiple transmit data ports or multiple receive data ports), in which case the data ports may each be aligned to the reference port, either individually or in groups. The reference port may also include multiple transmitters and/or receivers, which may be located in different physical positions.

In one approach, alignment of the receive data port 230 and transmit data port 240 can be undertaken independently. To align the receive data port 230, the reference transmitter 278 and the adaptive optics control loop are activated (thus aligning the wavefront sensor 220 with the reference port 270), and the receive data port 230 is adjusted to maximize coupling of the reference beam from the reference transmitter 278 to the receive data port 230. This aligns the receive data port 230 with the wavefront sensor 220. To align the transmit data port 240, the reference transmitter 278 and the adaptive optics control loop are activated. In addition, the transmit data port 240 is activated and adjusted to maximize coupling of the reference beam from the transmit data port 240 to the reference receiver 279. This aligns the transmit data port 240 with the wavefront sensor 220. The data ports 230, 240 may be dithered with respect to location in order to maintain maximum coupling and, therefore, alignment. Note that the reference beams may be beams separate from the primary beams or, in some cases, they may be the primary beam itself. For example, the reference beam from the transmit data port 240 to the reference port 270 may be the primary optical beam generated by the transmit data port 240.

In some embodiments, the optical path from the reference port 270 to the wavefront sensor 220 and data ports 230, 240 is preferably aligned with the path of incoming light 251. In other embodiments, the alignment method 300 may occur, for example, at a time when there is no transmission of light 251. In this situation, the reference port 270 can be used to mutually align the wavefront sensor 220 and the data ports 230, 240, without respect to the path of incoming light 251. When incoming light 251 is present, the controller 222 corrects the misalignment with the path of incoming light 251 by adjusting the variable phase device 224 such that the previously aligned wavefront sensor 220 and data ports 230, 240 are then also aligned with the path of incoming light 251.

Further, some or all of the steps in FIG. 3 can be repeated as many times as necessary, or even on an ongoing basis. For example, if the terminal is used in an environment that continuously misaligns the various components, the alignment process can be used periodically to restore alignment of the components. In one approach, the reception and/or transmission of the primary beam 251 is temporarily interrupted to run the alignment process. In a different approach, the alignment process can be run simultaneously with the reception and/or transmission of the primary beam 251, if the signals produced by the reference transmitter 278 can be separated from those produced by the incoming light 251. In one approach, they may be optically separated by wavelength: the reference transmitter 278 produces a reference beam of one wavelength and the received primary beam 251 is a different wavelength. In another approach, the light from the reference transmitter 278 may be modulated at a certain frequency and then recovered from the detected electrical signal by frequency filtering. Other separation approaches will be apparent.

Figure 4:
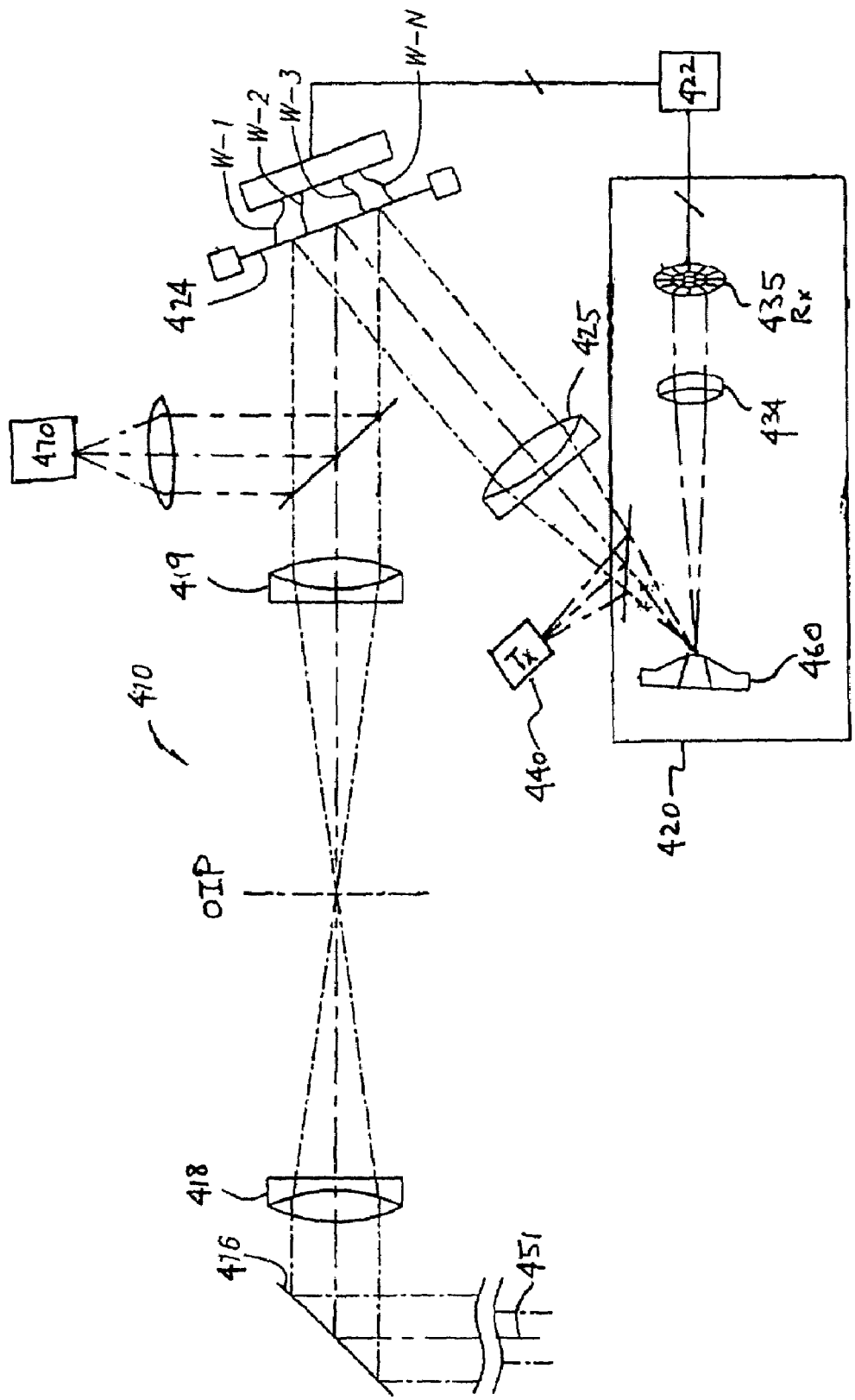
FIG. 4 is an illustration of one implementation of the adaptive optics module of FIG. 2.

FIG. 4 is an illustration of a specific implementation of the adaptive optics module of FIG. 2. This system includes a telescope 410 with an adaptive optics module. Light rays 451 from the remote light source enter the system via the tip-tilt mirror 416, travel through a lens 418 that focuses the light rays on an object plane OIP.

In one embodiment, the remote light source is a transmitter for a free-space optical data communications system and the receiving telescope 410 is designed to be positioned vertically. The tip-tilt mirror 416 can be pivoted about two perpendicular axes, one on the vertical axis of the telescope like a turret and the other horizontal in the plane of the mirror, to cause tip and tilt adjustments. As an alternative, the telescope 410 may be rotatable about its vertical axis so that one axis of rotation for the mirror 416 may be eliminated. Other alternative arrangements may be used for the course pointing or aiming of the telescope, such as using other tip-tilt mirrors or translating the objective lens by small amounts.

Returning to FIG. 4, the light rays from the object plane OIP pass through a collimating lens 419 to a deformable mirror 424. The deformable mirror 424 is dynamically shaped to correct for aberrations in the wavefront. It is controlled according to wavefront measurements made by the wavefront sensor 420. The conjugates of the deformable mirror 424 can be adjusted, for example by inserting a conjugate tuning element at the OIP. Examples of conjugate tuning elements include an insertable lens, zoom lens, or a second deformable mirror.

Various types of wavefront sensors and deformable mirrors may be used. In this example, the deformable mirror 424 is a deformable curvature mirror based on applying different voltages across different areas of a piezoelectric material, thus causing deformation. Further details for this type of deformable mirror are described and shown in U.S. Pat. No. 6,464,364, "Deformable Curvature Mirror," filed Jan. 25, 2001 and issued Oct. 15, 2002, by J. Elon Graves and Malcolm J. Northcott; U.S. Pat. No. 6,568,647, "Mounting Apparatus for Deformable Mirror," filed Jan. 25, 2001 and issued May 27, 2003, by J. Elon Graves and Malcolm J. Northcott; and U.S. Pat. No. 6,721,510, "Atmospheric Optical Data Transmission System," filed Jun. 16, 2001 and issued Apr. 13, 2004, by J. Elon Graves and Malcolm J. Northcott. In the example of FIG. 4, the wavefront sensor 420 is a wavefront curvature sensor based on defocused pupil images. Further details for this type of wavefront curvature sensor are described and shown in U.S. Pat. No. 6,452,145, "Method and Apparatus for Wavefront Sensing," filed May 26, 2000 and issued Sep. 17, 2002, by J. Elon Graves and Malcolm J. Northcott; and U.S. Pat. No. 6,721,510, "Atmospheric Optical Data Transmission System," filed Jun. 16, 2001 and issued Apr. 13, 2004, by J. Elon Graves and Malcolm J. Northcott. All of the foregoing are incorporated herein by this reference.

In FIG. 4, the light rays reflect from the surface of the deformable mirror 424 to a lens 425 that refocuses the image on a vibrating membrane mirror 460. The light is reflected from the vibrating membrane mirror 460 through a lens 434 onto a segmented detector 435. When the membrane mirror 460 is not vibrating, that is, when it is flat, the deformable mirror 424 is imaged onto the detector 435. However, when the membrane mirror 460 vibrates, it flexes between concave and convex conditions so that the image is defocused, alternately positively and negatively, onto the detector 435. That is, the vibrating mirror 460 introduces a temporal defocus dither in the optical path. The membrane mirror 460 vibrates at a frequency that typically does not exceed a few tens of kilohertz. The optical path (or defocus) is effectively dithered at this same frequency and the wavefront information occupies a frequency band around the dither frequency. The segmented detector 435 detects the intensities at different locations (i.e., for each segment) and sends this information to the control module 422 for determining the curvature of the wavefront.

Software within the control module 422 derives the wavefront curvature and corresponding control signals are provided to the deformable mirror 424. Specifically, the variable focus dither introduced by the membrane mirror 460 results in a signal component at the dither frequency. The magnitude of this component is proportional to the wavefront curvature within the pupil and proportional to the wavefront radial tilt on the boundary of the pupil. The wavefront is derived or recovered by solving the Poisson equation with respect to intensities with Neumann boundary conditions relative to the shape of the extra focal images. An iterative data reduction algorithm or other non-linear fitting technique may be employed to compensate for non-linearity in measurements in an open loop system.

The control module 422 provides separate and controlled high voltage signals to electrode segments on the back of the deformable mirror 424, as represented by the reference numerals W-1 through W-N. The deformable mirror 424 is positioned to reflect light rays from the collimating lens 419 to the wavefront sensor 420. The overall slope and curvature of the deformable mirror 424 can be controlled by varying the voltages applied to the electrodes.

When the deformable mirror 424 is not activated and working in closed loop with the wavefront sensor 420, the image at the detector 435 is the uncorrected image received by telescope 410. When the deformable mirror 424 is appropriately deformed to compensate for aberrations, the corrected image at detector 435 will be improved and possibly even diffraction limited. Similarly, if the system is used for data transmission, the detector 435 will receive and detect corrected light rays when the deformable mirror 424 is properly deformed. In addition, the same mirror shape can be used to pre-correct an optical beam transmitted through the system.

In this implementation, the detector 435 is segmented. The optical pupil is divided into subapertures, with each subaperture portion of the optical beam falling on a separate detector segment. Each detector segment generates a separate electrical signal as indicated by the slash across the line running from the segmented detector 435 to the control module 422. Each electrical signal provides information about the overall wavefront and the wavefront determination is made by processing these electrical signals.

For data detection purposes, the segmented detector 435 essentially operates as a light bucket. Data can be recovered by combining some or all of the electrical signals and processing the combined signal. The wavefront information and data signal can be separated on the basis of frequency, for example. Thus, segmented detector 435 functions both as part of the wavefront sensor 420 and as part of the receive data port.

Other types of receive data ports 430 can be used in alternate embodiments. Examples include a conventional detector in a video camera, a charge coupled device (CCD), a PIN diode, an optical fiber, a photon counting detector, or arrays of any of the foregoing.

The system in FIG. 4 also includes a transmit data port 440 that generates an optical beam traveling in the reverse direction. The approach shown in FIG. 3 can be used to align the reference port 470, the wavefront sensor 420 and the transmit data port 440. However, a separate alignment to the receive data port (step 330) is not required since the receive data port and the wavefront sensor 420 are implemented as a single device.

Although the detailed description contains many specifics, these should not be construed as limiting the scope of the invention but merely as illustrating different examples and aspects of the invention. It should be appreciated that the scope of the invention includes other embodiments not discussed in detail above.

For example, the invention has been described above with respect to aligning an adaptive optics module and a data port in a free space optical communications terminal. It should be appreciated that the methods and systems described herein can also be practiced in free space optical terminals that send or receive light that is not encoded with data without departing from the invention. For example, the transmit data port may send an unencoded beam for energy delivery to a remote device or as a probe beam sent to, e.g., retro-reflector. As a further example, the receive data port may receive an unencoded beam sent as a probe beam from a remote source.

As another example, in FIGS. 2-4, the adaptive optics module is closed loop. The wavefront sensor 220, 420 is located downstream of the variable phase device 224, 424 and is controlled based on the wavefront after correction by the variable phase device 224, 424. For example, the control algorithm may attempt to drive the residual aberrations to zero. In alternate embodiments, the adaptive optics module can be open loop. For example, referring to FIG. 2, the wavefront sensor 220 can be moved upstream of the variable phase device 224. In this arrangement, the wavefront sensor 220 preferably receives light directed to it from a beamsplitter inserted in the optical path, for example, between lens 218 and the variable phase device 224. In this approach, the wavefront sensor 220 takes a measure of the wavefront without correction by the variable phase device 224. The control module 222 calculates a desired correction and attempts to drive the variable phase device 224 to implement the desired correction.

As another example, it is possible and may be preferable in some cases for the variable phase device 224, 424 to be the outermost element of the optical train, as opposed to located within the telescope optics. The variable phase device 224, 424 can also be implemented as more than one device. For example, separate devices may be used to post-correct the incoming beam and pre-correct the outgoing beam. Alternately, a common correction may be applied to both the incoming and outgoing primary beams, with additional devices providing incremental (or differential) correction. Such an arrangement may be beneficial, for instance, in communicating with satellites, where an optical beam may have a degree of "point ahead" to compensate for satellite motion.

As another example, different functions described above can be implemented in different physical forms. Depending on the specific application, functionality can be implemented as hardware, firmware, software, and/or combinations of these. In much of the description above, different functions were implemented as dedicated circuitry in order to take advantage of lower power consumption and higher speed. In other applications, the same functionality can be implemented as software, typically running on digital signal processors or even general-purpose processors. Various combinations can also be used. For example, certain operations may be common enough as to be available as standard components, software, or circuit designs. These may be combined with customized implementations of the remaining functionality.

Similarly, "coupling" between modules may also take different forms. Dedicated circuitry can be coupled to each other by hardwiring, by a shared bus or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A free space optical communications terminal, comprising:
    a data port;
    an adaptive optics module including a wavefront sensor, the adaptive optics module positioned to correct a primary optical beam transmitted to or from the data port;
    a reference port for transmitting a first reference beam to the wavefront sensor and further for either transmitting a second reference beam to or receiving a second reference beam from the data port; and
    a controller for aligning the wavefront sensor and the reference port based on the first reference beam and further for aligning the data port and the reference port based on the second reference beam, wherein the controller is coupled to a position adjustment mechanism of the data port.

2. The free space optical communications terminal of claim 1 wherein the data port is a receive data port, the second reference beam is transmitted from the reference port to the receive data port, and the first and second reference beams are the same reference beam.

3. The free space optical communications terminal of claim 1 further comprising:
    a second data port, wherein:
        one data port is a receive data port and the other data port is a transmit data port;
        the reference port is for transmitting the second reference beam to the receive data port and for receiving a third reference beam from the transmit data port; and
        the controller is for aligning the reference port and the receive data port based on the second reference beam and for aligning the reference port and the transmit data port based on the third reference beam.

4. The free space optical communications terminal of claim 3 wherein the reference port includes an optical fiber for both transmitting the second reference beam to the receive data port and for receiving the third reference beam from the transmit data port.

5. The free space optical communications terminal of claim 3 wherein the reference port comprises a transmitter for generating the second reference beam and a receiver for receiving the third reference beam, and the transmitter and receiver are laterally offset relative to each another.

6. The free space optical communications terminal of claim 1 wherein the adaptive optics module further includes a variable phase device, wherein both the first and second reference beams propagate between the reference port and the variable phase device.

7. The free space optical communications terminal of claim 6 wherein the controller aligns the wavefront sensor and the reference port by adjusting the variable phase device according to a wavefront of the first reference beam.

8. The free space optical communications terminal of claim 6 wherein the variable phase device comprises a deformable mirror.

9. The free space optical communications terminal of claim 1 wherein the controller aligns the data port and the reference port by adjusting a position of the data port to maximize coupling of the second reference beam between the data port and the reference port.

10. The free space optical communications terminal of claim 9 wherein the controller is further for dithering the position of the data port.

11. A free space optical communications terminal, comprising:
    a transmit data port for transmitting a primary optical beam;
    an adaptive optics module including a deformable mirror and a wavefront sensor, the deformable mirror positioned to pre-correct the primary optical beam;
    a reference port for transmitting a first reference beam to the wavefront sensor via the deformable mirror and further for receiving a second reference beam from the transmit data port via the deformable mirror; and
    a controller for aligning the wavefront sensor and the reference port by adjusting the deformable mirror according to a wavefront of the first reference beam, and further for aligning the transmit data port and the reference port based on a strength of the second reference beam received at the reference port, wherein the controller is coupled to a position adjustment mechanism of the transmit data port.

12. The free space optical communications terminal of claim 11 further comprising a receive data port for receiving a second primary optical beam, wherein:
    the deformable mirror is positioned to correct the second primary optical beam;
    the reference port is further for transmitting a third reference beam to the receive data port via the deformable mirror; and
    the controller is further for aligning the reference port and the receive data port based on a strength of the third reference beam received at the receive data port.

13. The free space optical communications terminal of claim 12 wherein the primary optical beams and the reference beams propagate along similar optical paths in a vicinity around the deformable mirror.

14. The free space optical communications terminal of claim 11 wherein the controller aligns the transmit data port and the reference port by adjusting a position of the transmit data port to maximize coupling of the second reference beam between the transmit data port and the reference port.

15. The free space optical communications terminal of claim 11 wherein the primary optical beam and the second reference beam are the same optical beam.

16. In a free space optical communications terminal having a wavefront sensor, a data port and a reference port, a method of aligning the wavefront sensor and the data port comprising:
    transmitting a first reference beam from the reference port to the wavefront sensor;
    aligning the wavefront sensor and the reference port based on the first reference beam;

transmitting a second reference beam between the reference port and the data port; and aligning the data port and the reference port based on the second reference beam by adjusting a position of the data port.

17. The method of claim 16 wherein aligning the wavefront sensor and the reference port based on the first reference beam comprises:

applying an adaptive optics wavefront correction to the first reference beam.

18. The method of claim 17 wherein the adaptive optics wavefront correction comprises a first order adaptive optics wavefront correction.

19. The method of claim 16 wherein aligning the data port and the reference port based on the second reference beam comprises:

measuring a strength of the second reference beam; and adjusting a position of the data port to maximize the measured strength of the second reference beam.

20. The method of claim 16 further comprising:

periodically performing the steps of aligning and transmitting set forth in claim 16; and during a time period between the performance of said steps of aligning and transmitting, using the wavefront sensor to correct a primary optical beam transmitted to or from the data port.

* * * * *